United States Patent [19]

Jakabhazy et al.

[11] 4,248,913
[45] Feb. 3, 1981

[54] PROCESS FOR PREPARING A MEMBRANE

[75] Inventors: Stephen Z. Jakabhazy, Weston; Leos J. Zeman, Winchester, all of Mass.

[73] Assignee: Abcor, Inc., Wilmington, Mass.

[21] Appl. No.: 42,039

[22] Filed: May 24, 1979

Related U.S. Application Data

[63] Continuation-in-part of Ser. No. 966,868, Dec. 6, 1978, abandoned.

[51] Int. Cl.³ .......................... B05D 5/00; B01D 13/00
[52] U.S. Cl. ..................................... 427/244; 427/245; 427/352; 427/246; 210/500.2
[58] Field of Search ............................. 264/41, 48, 49; 521/905; 427/244, 245, 246; 210/500 M, 490, 491, 23 F

[56] References Cited

U.S. PATENT DOCUMENTS

| | | | |
|---|---|---|---|
| 2,884,387 | 4/1959 | Bieber et al. | 521/905 X |
| 3,194,727 | 7/1965 | Adams et al. | 162/163 |
| 3,216,882 | 11/1965 | Feldt et al. | 521/905 X |
| 3,247,133 | 4/1966 | Chen | 260/2.1 |
| 3,276,996 | 10/1966 | Lazare | 210/22 |
| 3,615,024 | 10/1971 | Michaels | 210/490 |
| 3,750,735 | 8/1973 | Chang et al. | 210/23 |
| 3,951,621 | 4/1976 | Hughes et al. | 55/16 |
| 4,113,912 | 9/1978 | Okita | 427/316 X |

Primary Examiner—Frank A. Spear, Jr.
Attorney, Agent, or Firm—Richard P. Crowley

[57] ABSTRACT

A process for preparing a microporous polymeric membrane, which process comprises preparing a polymer-casting solution, casting a thin film of the casting solution on a support base, allowing partial evaporation of the solvent from the cast film for a predetermined period of time and contacting the partially evaporated cast film with the microporous leaching liquid to provide a membrane, the improvement which comprises: providing a casting solution which comprises a vinylidene fluoride polymer and from about 35 to about 85% by weight of a vinyl acetate polymer; and hydrolyzing the acetate polymer after the leaching step to convert the acetate groups to hydroxyl groups, to provide an improved membrane having good mechanical strength and hydrophilic properties.

22 Claims, 1 Drawing Figure

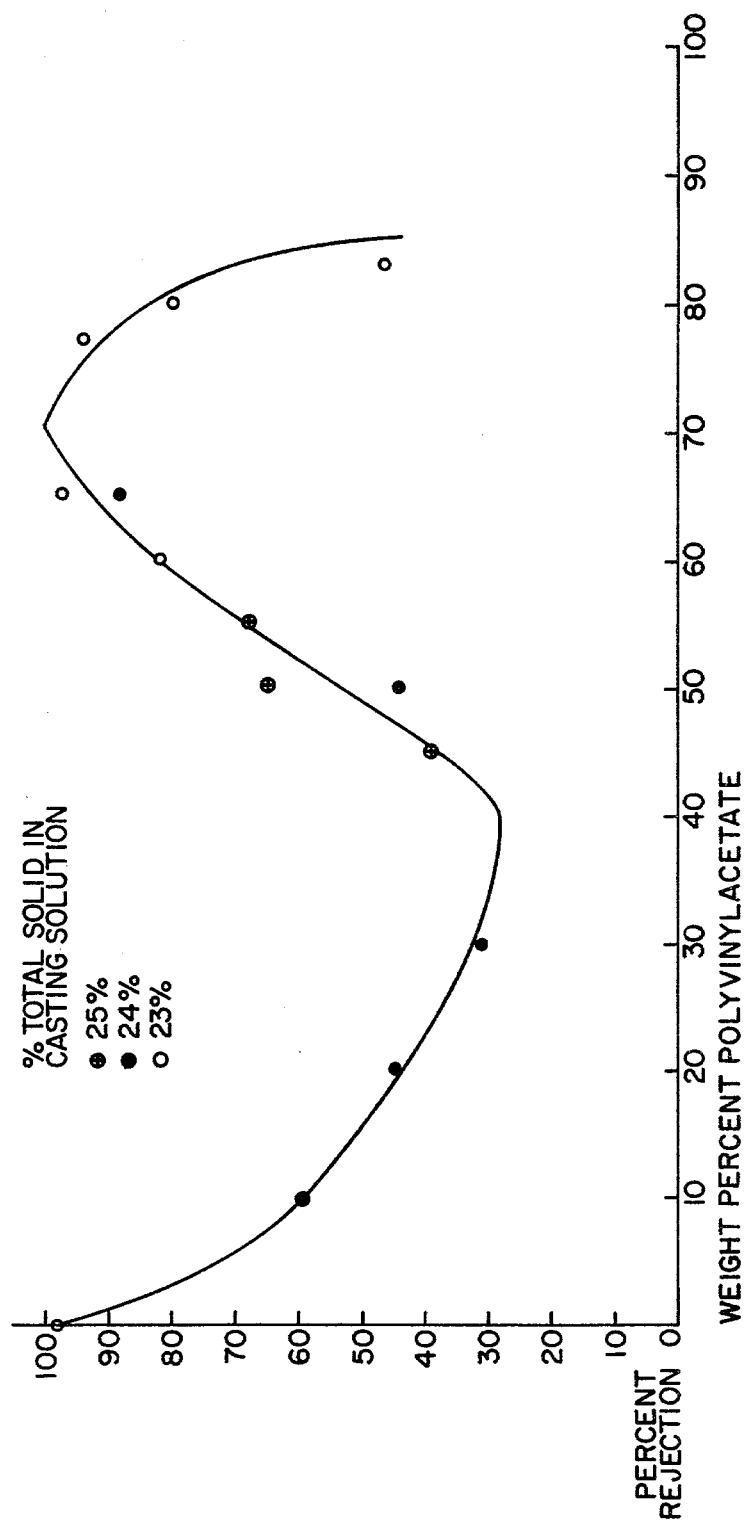

PROCESS FOR PREPARING A MEMBRANE

REFERENCE TO PRIOR APPLICATION

This application is a continuation-in-part application of U.S. Ser. No. 966,868, filed Dec. 6, 1978, hereby incorporated by reference, now abandoned.

BACKGROUND OF THE INVENTION

A wide variety of polymers have been used and suggested for use as membrane materials in membrane processes, such as for use in ultrafiltration, reverse osmosis and electrodialysis membrane processes. Polymer membranes are employed for separating selectively molecules, ions and suspended particles from carrier fluids. Polymer membranes have been employed and suggested for ultrafiltration purposes, for separating proteins and other comparatively large molecules from water, such as, for example, the separation of proteins from lactose and mineral salts in whey, which is a by-product of the dairy industry. In addition, polymer membranes also have been suggested for use in the ultrafiltration of soluble or suspended oils, such as the so-called water-soluble oils, which are often the effluent of operations which employ oils as coolants for high-speed metal-cutting machines.

In separations involving water-based carriers, it is desirable to employ a membrane which has good mechanical strength and which also exhibits desirable hydrophilic properties. This application is directed to a process for preparing improved membranes which exhibit good hydrophilic properties which overcome some of the problems and difficulties of preparing membranes in the prior art, and which improved membranes are useful particularly in the dairy field; for example, for the ultrafiltration of whey, and with oil-water emulsions, such as the ultrafiltration of soluble cutting-oil emulsions.

SUMMARY OF THE INVENTION

This invention is directed to a process for preparing an improved membrane having hydrophilic properties and good mechanical strength, using particular membrane-casting solutions.

The present invention is an improvement in the conventional process of preparing a microporous polymeric membrane, which process comprises preparing a polymer-casting solution, casting a thin film of the casting solution on a support base, allowing partial evaporation of the solvent from the cast film for a predetermined period of time and contacting the partially evaporated cast film with a leaching liquid to provide the microporous membrane, wherein the improvement comprises:

(a) providing a casting solution which comprises a polyvinylidene fluoride polymer and from about 35 to about 85% by weight of a vinyl-acetate polymer; and (b) hydrolyzing the acetate polymer after the leaching step to convert the acetate groups to hydroxyl groups and provide an improved membrane having good mechanical strength and hydrophilic properties.

There are many compelling reasons for the modification of the hydrophobic character of certain polymeric membranes, such as for the modification of the extreme hydrophobic character of fluorocarbon polymers, such as polyvinylidene fluoride (PVDF), in order to render the membrane and membrane surface more hydrophilic in character. Chemical modification of PVDF is difficult, because of the extreme inertness and chemical resistance of PVDF. The admixture of other polymeric components into PVDF, which polymer components, themselves, possess desirable properties which one would want to impart to PVDF, such as improved hydrophilic nature, presents other difficulties.

Typically the compatibility of the PVDF polymer with hydrophilic polymers in general is very limited. Moreover, membranes made of PVDF polymeric blends, which employ a high enough concentration of the hydrophilic component, such as polyvinyl pyrrolidone, to impart sufficient hydrophilic characteristics to the resulting membrane surface, possess very low mechanical strength. Often when employed at very high levels, the hydrophilic polymer blended with the hydrophobic polymer leaches out from the prepared membrane blend. Therefore, while it is very desirable to prepare an improved membrane of a fluorocarbon, such as PVDF, having hydrophilic properties, there has been considerable difficulty in preparing such a membrane.

It has been found that an improved polymer membrane is prepared from a polymer blend of a hydrophobic polymer, such as a hydrophobic, inert, chemically resistant, fluorocarbon polymer, such as a vinylidene fluoride polymer, and a precursor material, such as a polymer which has good compatibility with the hydrophobic polymer, and which precursor polymer, such as a vinyl acetate polymer, may be altered chemically, such as by hydrolysis, after casting and forming of the membrane, to render hydrophilic in nature the blended polymer or alloy membrane so prepared. Thus a precursor polymer, characterized by being converted to a hydrophilic polymer and being compatible in a solvent solution with the hydrophobic polymer, may be employed to prepare an improved alloy-type membrane exhibiting good mechanical strength, desirable membrane properties and, in particular, a hydrophilic membrane surface and properties.

It has been discovered that the precursor polymer particularly suitable for use with a vinylidene fluoride polymer, such as PVDF as the precursor polymer, is a vinyl acetate polymer, such as polyvinyl acetate. Polyvinyl acetate is compatible with PVDF in all proportions, and, furthermore, the precursor polymer is hydrolyzed easily to an ideal hydrophilic polymer; to wit, to polyvinyl alcohol, thereby providing an improved hydrophilic membrane containing hydroxyl groups.

One improved alloy membrane comprises an admixture of PVDF and from about 40 to 90% by weight of a polyvinyl acetate, which is converted by hydrolysis into polyvinyl alcohol to form a PVDF-polyvinyl alcohol membrane. The improved composition so prepared has the property of being extremely hydrophilic and contains hydroxyl groups on the membrane surface. The hydroxyl groups may be reacted to alter further the chemical and other properties of the membrane, such as, for example, by grafting vinyl monomers onto the hydrophilic membranes, such as by the reaction of styrene sulfonic acid monomers with the hydroxyl groups, or by the reaction of other anionic- and cationic-type materials with the hydroxyl groups, to alter the surface charge on the membrane surface. The reactants employed should be capable of reacting with the hydroxyl groups, such as by grafting, epoxidation, etc. The improved membranes, due to their hydrophilic nature, may be dried and stored, and the dried membranes may be wetted easily and used without potential loss in the performance of the improved membranes.

It has been discovered unexpectedly and surprisingly that high levels of the precursor vinyl acetate polymer are required in order to render hydrophilic the fluorocarbon resin polymer membrane. Typically the amounts required in mixtures are over about 35% by weight per total amount of polymer. In addition, it has been found unexpectedly that the improved PVDF-polyvinyl alcohol alloy membrane is an extremely tough membrane with high mechanical strength, even though generally consisting of as much as 75 to 80% of polyvinyl alcohol, in comparison to a maximum of about 15 to 20% of polyvinyl pyrrolidone that may be tolerated in PVDF-polyvinyl pyrrolidone membranes. Where the polyvinyl alcohol content in the alloy membrane is too low or below approximately 25% by weight based on the total polymer, the performance of the alloy membrane, in separating oil and water emulsions, is not satisfactory in that the membrane is not sufficiently hydrophilic in nature.

One unique feature of the improved alloy membrane is the apparent strong interaction which binds the polymers together, which is manifested by the toughness of the membranes at high polyvinyl alcohol contents and the inability to leach out polyvinyl alcohol from the improved alloy membrane, even in boiling water over a period of weeks, and the very high rejection of the membranes within certain composition ranges. Therefore, the improved membrane, comprising PVDF in blend with hydrolyzed polyvinyl acetate, is a unique membrane which overcomes difficulties associated with prior-art attempts to impart hydrophilic characteristics to otherwise hydrophobic fluorocarbon polymer membranes.

The improved membranes of the invention are prepared in the usual manner of preparing such polymeric membranes, except for the employment of the membrane-casting solution and subsequent steps of altering the chemical nature of the polymer to render hydrophilic in nature the resulting improved polymer. In a method of preparing an improved membrane or an alloy membrane of this invention with desirable hydrophilic properties, the method comprises preparing a casting solution of a polymer and a solvent for the polymer; coating the casting solution to form a cast film of the membrane typically on permeable support material, such as fabric support material, to form a thin cast film on the support, either in thin, flat film or in tubular form; allowing the partial evaporation of the solvent from the cast film; and, thereafter, contacting, such as by immersing, the partially evaporated cast film with a leaching liquid, such as by immersing into a leaching bath typically of water, which leaching bath has a liquid miscible with the solvent of the casting solution, and which liquid is not a solvent for the membrane polymer, thereby forming a microporous membrane of the polymer, the improvement which comprises: preparing a membrane-casting solution of a polymer and a precursor polymer as described, and, thereafter, chemically altering, such as by hydrolyzing, the precursor polymer, typically the vinyl acetate polymer, such as polyvinyl acetate, in the cast membrane after casting and leaching to convert the acetate groups of the vinyl acetate polymer into hydroxyl groups to form polyvinyl alcohol in the polymer blend, thereby providing an alloy-type membrane of good mechanical properties and having increased hydrophilic properties.

The membrane-casting solution employed in the preparation of the improved membranes of this invention comprises a solvent solution of a hydrophobic polymer, such as a hydrophobic, chemically inert and chemically resistant fluorocarbon polymer, such as a vinylidene fluoride polymer, such as PVDF, and a precursor polymer, such as, for example, a vinyl acetate polymer, such as polyvinyl acetate, which precursor polymer is compatible with the hydrophobic polymer in the solution, and which precursor polymer may be altered chemically, such as through hydrolysis, to convert the hydrophobic acetate groups to hydrophilic hydroxyl groups after formation of the cast membrane surface, such as to permit the hydrolysis of the polyvinyl acetate precursor to polyvinyl alcohol, and wherein the precursor polyvinyl acetate comprises about 40 to about 85% by weight of total polymer in the blend to form a PVDF-polyvinyl alcohol, improved, alloy membrane of desired properties.

In the preparation of the membrane-casting solution for the preparation of improved membranes of this invention, a wide variety of solvents may be employed; however, the choice of solvents is important, since the solvent choice usually affects membrane morphology, as well as membrane performance. With PVDF, most aprotic polar solvents, such as dimethyl acetamide, dimethyl formamide, N-methyl pyrrolidone, dimethyl sulfoxide and similar solvents, are acceptable solvent choices for dissolving and forming membrane-casting solutions of PVDF and the precursor polymer.

In general, solvents are employed which are soluble or miscible in the leaching liquid; for example, water, and which solubilize both the PVDF and the precursor polymer and in which the two polymers are compatible. Volatile organic solvents, such as acetone, may be employed, and the time between casting and leaching may be controlled by the evaporation rate of the solvent to produce membranes of desired properties. Where such aprotic polar solvents are employed alone, there may occur occlusions, resulting in an undesirable morphology of the membrane structure and in poor compaction resistance of the membrane. It is, therefore, often desirable to reduce the solvent power of the aprotic solvent in the membrane-casting solution, in order to increase the rate of coacervation at the interface of the cast membrane with its first contact with the leaching liquid. Thus typically a nonsolvent or diluent liquid material is employed to result in a more stable and stronger interface and to avoid the formation of large occlusions in the resulting membrane.

A variety of nonsolvents or diluents may be employed, such as from about 10 to 70% by weight; for example, 20 to 50% by weight, of the casting solution. However, in the preparation of casting solutions containing PVDF and the precursor component, such as the vinyl acetate polymer, it has been found that triethyl phosphate is a particularly useful nonsolvent in replacing dimethyl formamide in increasing amounts in the casting solution. Where the concentration level of triethyl phosphate is from about 50 to 30% in a dimethyl formamide-containing, casting-solution mixture, large occlusions of the resulting cast film are avoided. Identical results are also obtained, for example, when N-methyl pyrrolidone is employed as a solvent and the nonsolvent is sulfolane at about 50% or higher levels of sulfolane concentration.

Another suitable casting solution with PVDF comprises acetone as the solvent and triethyl phosphate as the nonsolvent. Any nonsolvent employed should be compatible with the solvent and compatible with the leaching bath, so that it may be removed with the solvent in the leaching bath. An additional benefit of employing a diluent or nonsolvent in the membrane-casting solution is that such nonsolvent permits variations in the viscosity of the membrane-casting solution at fixed total solids level. The membrane-casting solutions of the present invention provide for a greater flexibility in terms of modification of the casting solutions and the casting solutions of any other known commercial membrane systems. It has been found also that, due to the very high viscoelastic non-Newtonian nature of the membrane-casting solutions, very low solid levels of the fluorocarbon polymer and the precursor polymer can be used, and films may be cast particularly in tubular form, leading to high flux-type membranes.

Improved membranes have been prepared employing PVDF-polyvinyl acetate blends containing between 0 and 95% by weight of polyvinyl acetate, based on total polymer. Membranes made from blends with more than about 85% polyvinyl acetate are mechanically too weak after hydrolysis to be of any practical importance, while membranes made from blends with less than about 35% do not have sufficiently hydrophilic character. It has been found that, for optimum membrane performance for most applications, but particularly for ultrafiltration of oil-in-water emulsions, dairy applications, electrocoating applications and the like, polyvinyl acetate levels of between 60 and 80% are most desirable.

The PVDF employed is a thermoplastic polymer, which polymer is available from various sources with various degrees of chain regularity and crystallinity. It has been found that the most preferred PVDF to be employed for the separation of oil-in-water emulsions is a linear polymer of high crystallinity.

The preferred precursor polymer with PVDF is a vinyl acetate polymer which may be a homopolymer or a copolymer, with suitable copolymers including copolymers of vinyl acetate with acrylates, maleates and ethylene, and preferably is polyvinyl acetate, which polymer may be obtained from various sources. However, it has been found that polyvinyl acetates of high molecular weights, typically over about one million daltons, are the preferred vinyl acetate polymers to be used with the linear, high crystallinity PVDF.

It has been found that the range of total solids in the membrane-casting solution useful for membrane formation may vary, but includes from about 10 to 30% by weight, with a preferred range of the polymers in the membrane-casting solution of from about 20 to 25% by weight. For some particular ultrafiltration applications, such as ultrafiltration of water and oil emulsions, the preferred range is 15 to 22%, while for other applications, such as for dairy applications and the ultrafiltration of whey, the preferred range is often 20 to 25%, with both flux and rejection affected by the total solids in the membrane-casting solution. The thickness of the cast film used to prepare the improved membrane may vary as desired, but often such cast film is cast upon a porous or permeable material, typically a fabric-type support composed of, for example, polypropylene fibers or nonwoven fibrous material, the thickness of the cast film varying, for example, from 5 to 50 mils, but typically about 10 to 25 mils above the permeable support base, while, for high rejection-type ultrafiltration membranes, a range of about 16 to 18 mils is often the optimum thickness.

In the preparation of the improved membranes, the time of evaporation of the solvent (curing); that is, a time period between casting of the membrane film and the leaching of the film, may vary; however, it has been found that, for most applications, a relatively short curing or evaporating time is preferred, typically between 1 and 60 seconds; for example, between 5 and 20 seconds. The leaching liquid employed may vary; however, for most purposes, the leaching liquid is water at about room temperature of 20 to 25%. However, to attain the best membrane morphology with the particular solvent/nonsolvent membrane-casting solution as described, it is often preferred to leach at slightly elevated temperatures; that is, usually above 35° C.; for example, 40° to 80° C.

After the recovery of the cast leached membrane from the leaching bath, the final process step to prepare the improved membrane is the alteration of the precursor polymer in the cast leached membrane film, such as by the treatment or reaction of the cast membrane with a desired reactant to introduce hydrophilic groups into the membrane by the alteration of the precursor polymer in the membrane. In the improved membrane of PVDF-polyvinyl acetate, the acetate groups in polyvinyl acetate are hydrolyzed through chemical treatment and reaction to provide for the conversion of the acetate groups to hydroxyl groups, thereby converting all of the vinyl acetate to vinyl alcohol. The techniques for converting polyvinyl acetate to polyvinyl alcohol are well known (see, for example, U.S. Pat. No. 3,988,245, issued Oct. 26, 1976). The techniques employed to hydrolyze the polyvinyl acetate may vary, depending upon the membrane support material, which might be exposed to the chemical reaction. One hydrolysis process involves the use of nonaqueous sodium methanolate-catalyzed methanolysis of polyvinyl acetate, while another technique uses aqueous acid or base-catalyzed hydrolysis reactions. Since most membranes are cast on a permeable membrane support, often the better choice, with respect to protection of the membrane support, is the aqueous acid-catalyzed hydrolysis technique. Typical hydrolysis procedures for a flat-sheet membrane would comprise the use of 1% by volume of sulfuric acid at 100° C. for over 24 hours, while, for a tubular cast membrane, 10% by weight of sulfuric acid at 80° to 85° C. over 16 to about 20 hours may be employed. Other acids may be employed; however, sulfuric acid is the most preferred acid, as it does not destroy the fabric support material.

The PVDF-polyvinyl alcohol membranes prepared as described have desirable properties for use as ultrafiltration membranes in concentrating water-based liquid streams in the dairy and oil emulsion applications and as substrates for reverse osmosis membranes, particularly where the reactive hydroxyl groups are further reacted.

The improved PVDF-polyvinyl alcohol membranes are vastly superior in properties to membranes, for example, wherein polyvinyl acetate and PVDF are admixed without hydrolysis, since such membranes have a very low water flux and fail to reject oil in the ultrafiltration of water and oil emulsions. Further, the membranes containing PVDF and polyvinyl acetate, in which polyvinyl acetate is present in the concentration level of up to about 30% of total polymer, do not have sufficient hydrophilic properties after hydrolysis, and, in fact, such membranes have poorer performance characteristics in separation of oil and water than membranes formed from PVDF alone. Therefore, the membranes of this application and membrane-casting solution for their preparation are quite unique.

For the purpose of illustration only, the invention will be described in connection with its preferred embodiment; however, it is recognized that various changes and modifications may be made by those persons skilled in the art, all within the spirit and scope of the invention.

BRIEF DESCRIPTION OF THE DRAWING

The drawing is a graphical illustration of the percent rejection of a standard solution versus the weight percent of polyvinyl acetate based on total solids in a hydrolyzed polyvinyl acetate-PVDF-polymer membrane.

DETAILED DESCRIPTION OF THE INVENTION

The present invention is illustrated in its preferred embodiments by the following examples:

EXAMPLE 1

A membrane-casting solution is prepared by combining in a Waring Blender 168.0 g of triethyl phosphate (TEP) and 72.0 g of dimethyl formamide (DMF), and, while mixing at a slow speed, there is added 39.0 g of polyvinyl acetate (MW ~ 1,200,000). The admixture is mixed for the next 3 to 5 minutes, and, after that, the admixture is mixed periodically for short periods of time. Polyvinyl acetate dissolves into the solvent/nonsolvent solution of TEP and DMF in no more than about 2 to 3 hours. When all polyvinyl acetate is in solution, there is slowly added to the blender 21.0 g of PVDF, while agitating the solution in the blender. After the polymer has been mixed, the solution is allowed to stand for about 30 minutes. After final agitation, the solution is ready for centrifugation and casting.

EXAMPLE 2

A membrane-casting solution is prepared in a 5-gallon Hobart mixer kettle by adding 28.7 lbs of dimethyl acetamide (DMAc), and, while stirring, there is sifted slowly into the kettle 2.205 lbs of PVDF. Agitation is continued for about 45 to 60 minutes. There is then added 4.095 lbs of polyvinyl acetate while mixing. Mixing should continue at low speed over a period of about 2 hours. The Hobart kettle is then removed, covered tightly and placed in an oven at about 75° C. for an overnight period; for example, about 12 hours. The mixture is then agitated the next day for about an additional 2 hours while it is still warm. Thereafter, the membrane-casting solution is ready for use.

EXAMPLE 3

An improved membrane was prepared employing the casting solution as prepared in either Example 1 or 2 by casting the solution on a support material, such as a nonwoven web of polyester fibers of about 7 mils in thickness, taped to a glass plate and cast as an 18-mil-thick film layer. Within about 5 seconds, the cast film on the glass plate is immersed in water at a room temperature of 20° C., and the membrane is leached in the leaching water bath over a period of 16 to 24 hours. The PVDF-polyvinyl acetate membrane is then removed from the glass plate and is hydrolyzed in a solution comprising 1% by volume of sulfuric acid under reflux conditions over about 24 hours. The hydrolyzed membrane is then removed and washed and may, thereafter, be employed in membrane operations, such as the ultrafiltration of oil and water emulsions.

EXAMPLE 4

An improved membrane was made from a casting solution as in Example 3, with the casting solution containing about 15% by weight of polyvinyl acetate, 8% by weight of PVDF, a combined total of about 23% by weight of the total polymer, and 77% by weight of dimethyl acetamide. The membrane-casting solution was cast at 8-mils thickness on a porous polyester support sheet, was left exposed to air for about 60 seconds and then was leached in water at room temperature. The cast membrane was then recovered and hydrolyzed as in Example 3. The membrane was then tested at 50 psig and at 25° C. in a flat cell employing two standard watersurfactant solutions containing 1000 ppm of the surfactant. The surfactants employed were surfactants commercially known as Tetronic surfactant 1107 and Tetronic surfactant 707, which are commercially made and produced by BASF-Wyandotte Corporation. Tetronic is a trademark for a nonionic tetrafunctional series of surfactant polymers, which are polyoxyalkylene derivatives of ethylene diamine, with Tetronic 1107 having an average molecular weight of approximatly 14,500 and Tetronic 707 having an average molecular weight of approximately 12,000. The membranes were tested by measuring the surfactant concentration in the feed and permeate streams, as well as the permeate flux. Results of the test, expressed as percent rejection of the surfactant and permeate flux in gallons per square foot per day (GFD), are shown in Table I.

TABLE I

| Tetronic 1107 | | Tetronic 707 | |
| --- | --- | --- | --- |
| Flux GFD | Rejection % | Flux GFD | Rejection % |
| 24.5 | 99.3 | 20.5 | 99.5 |

EXAMPLE 5

A membrane was prepared from a casting solution containing 12% polyvinyl acetate, 6% PVDF and 82% dimethyl acetamide and was cast at 11-mils thickness on a polyester support, cured for 5 minutes and then tested after hydrolysis with a synthetic oil-in-water emulsion. The process flux at 30 psig was 200 GFD, with less than 6 ppm of oil in the permeate stream.

EXAMPLE 6

Membranes as prepared in Example 5, but cast at various thicknesses, were tested using skimmed milk at thicknesses of between 15 and 25 mils, with the following results:

| Elapsed Time Min. | Relative Flow Rate | 15 mils GFD | 20 mils GFD | 25 mils GFD |
| --- | --- | --- | --- | --- |
| 15 | 1 | 19.6 | 15.6 | 26.0 |
| 120 | 1 | 22.1 | 18.2 | 26.0 |
| 130 | 3 | 32.5 | 45.5 | — |
| 150 | 1 | 19.6 | 18.2 | — |

Membranes were prepared from casting solutions containing 25, 24 and 23 weight percent polymer in dimethyl acetamide at a variable PVAC-to-PVDF ratio. Membranes were cast at 25-mils thickness on a polyester support and left exposed to air for about 5 seconds before immersion in a water-leaching bath. Polyvinyl acetate then was converted almost entirely to polyvinyl alcohol through hydrolysis. The membranes so prepared were then tested for rejection employing aqueous solutions containing 1000 ppm of Tetronic surfactant. The accompanying graph shows percent rejection versus the weight percent of polyvinyl acetate in the casting solution.

As illustrated, a weight percent between approximately 40 weight percent polyvinyl acetate and about 85 weight percent polyvinyl acetate results in an abrupt change in the percent rejection. With amounts of polyvinyl acetate of less than 40 weight percent, membranes have a very low rejection, as do membranes made from solutions containing 85% polyvinyl acetate. As shown, membranes made from solutions containing between 60 to 80%, and preferably 70%, polyvinyl acetate have high rejection of Tetronic 1107. Similar tests conducted with Tetronic 707 show a similarly shaped curve with somewhat lower rejections.

Thus the preparation of a homogeneous blend of PVDF and polyvinyl acetate in an appropriate solvent and the subsequent hydrolysis of the membrane cast from this blend provide an improved membrane having unique hydrophilic and rejection properties.

What we claim is:

1. In a process for preparing a microporous polymeric membrane, which process comprises preparing a membrane-casting solution, casting a thin film of the casting solution on a support base, allowing partial evaporation of the solvent from the cast film for a predetermined period of time and contacting the partially evaporated cast film with a leaching liquid to provide the microporous membrane, the improvement which comprises:
    (a) providing a casting solution which comprises a vinylidene fluoride polymer and from about 35 to about 85 weight percent per total polymer of a vinyl acetate polymer; and
    (b) hydrolyzing the vinyl acetate polymer in the leached membrane to convert the acetate groups to hydroxyl groups and provide an improved membrane having good mechanical strength and hydrophilic properties.

2. The process of claim 1 wherein the vinylidene fluoride polymer is a substantially regular and linear vinylidene fluoride polymer having a high content of a crystalline phase.

3. The process of claim 1 wherein the vinyl acetate polymer is polyvinyl acetate having a molecular weight of more than about 1,000,000 daltons.

4. The process of claim 1 wherein the casting solution comprises a polar solvent selected from the group consisting of dimethyl acetamide, dimethyl formamide, N-methyl pyrrolidone, dimethyl sulfoxide and acetone.

5. The process of claim 1 wherein the casting solution comprises a solvent and a diluent, and wherein the diluent is selected from the group consisting of triethyl phosphate and sulfolane.

6. The process of claim 1 wherein the casting solution comprises dimethyl formamide as a solvent and triethyl phosphate as a diluent.

7. The process of claim 1 wherein the casting solution comprises N-methyl pyrrolidone as a solvent and sulfolane as a diluent.

8. The process of claim 1 wherein the casting solution is cast in a thin film onto a porous and fibrous support base.

9. The process of claim 1 wherein the film is cast in a thickness of about 5 to 50 mils on a porous support base.

10. The process of claim 1 wherein the film is hydrolyzed by contacting the membrane with sulfuric acid under hydrolyzing time and temperature conditions.

11. The process of claim 1 wherein the time of exposure to air of the film is between about 1 and 60 seconds, and wherein the temperature of the leaching liquid is between about 40° to 80° C. and the leaching liquid is water.

12. The process of claim 1 wherein the casting solution comprises acetone as a solvent and triethyl phosphate as a diluent.

13. The process of claim 1 wherein the casting solution comprises from about 60 to 80 percent by weight of a vinyl acetate polymer.

14. The process of claim 1 wherein the casting solution comprises from about 10 to 30% by weight of the polymer.

15. The process of claim 1 wherein the leaching liquid comprises water and the leaching temperature is from about 40° to 80° C.

16. The process of claim 1 which comprises hydrolyzing substantially all of the vinyl acetate polymer to convert all of the vinyl acetate to vinyl alcohol.

17. The process of claim 1 which comprises hydrolyzing the leached membrane by a nonaqueous sodium methanolate-catalyzed methanolysis of the vinyl acetate.

18. The process of claim 1 which comprises hydrolyzing the leached membrane by an aqueous acid or base-catalyzed hydrolysis reaction.

19. The process of claim 1 wherein the vinyl acetate polymer is polyvinyl acetate having a molecular weight of more than about 1,000,000 daltons and the vinylidene fluoride polymer is a substantially regular and linear vinylidene fluoride polymer having a high content of a crystalline phase.

20. The process of claim 1 which includes grafting vinyl monomers onto the membrane by reaction with the hydroxyl groups of the membrane.

21. The process of claim 20 which includes the reaction of styrene sulfonic acid monomers with the hydroxyl groups of the membrane.

22. In a process for preparing a microporous polymeric membrane, which process comprises preparing a membrane-casting solution, casting a thin film of the casting solution on a support base, allowing partial evaporation of the solvent from the cast film for a predetermined period of time and contacting the partially evaporated cast film with a leaching liquid to provide the microporous membrane, the improvement which comprises:
    (a) providing a casting solution which comprises an aprotic polar solvent and a diluent, a vinylidene fluoride polymer substantially regular and linear in structure with a high content of a crystalline phase, and from about 35 to 85 weight percent per total polymer of a vinyl acetate polymer having a molecular weight of over about 1,000,000 daltons; and
    (b) hydrolyzing the vinyl acetate polymer in the leached membrane by contacting the membrane with a hydrolyzing acid to provide an improved membrane containing a vinylidene fluoride polymer and a vinyl alcohol polymer, the membrane having good mechanical strength and hydrophilic properties.

* * * * *